(12) United States Patent
Lewis, Jr. et al.

(10) Patent No.: US 6,861,170 B2
(45) Date of Patent: Mar. 1, 2005

(54) VOLUMETRIC MICRO BATTERIES

(75) Inventors: David H. Lewis, Jr., Irvine, CA (US); John J. Waypa, Rancho Palos Verdes, CA (US); Erik K. Antonsson, Pasadena, CA (US); Charles D. E. Lakeman, Albuquerque, NM (US)

(73) Assignees: Northrop Grumman Corporation, Los Angeles, CA (US); TPL, Inc., Albuquerque, NM (US); California Institute of Technology, Pasadena, CA (US)

(*) Notice: Subject to any disclaimer, the term of this patent is extended or adjusted under 35 U.S.C. 154(b) by 13 days.

(21) Appl. No.: 09/948,034

(22) Filed: Sep. 5, 2001

(65) Prior Publication Data

US 2003/0044664 A1 Mar. 6, 2003

(51) Int. Cl.[7] .......................... H01M 6/04; H01M 12/06
(52) U.S. Cl. .............................. 429/27; 429/42; 429/44; 429/163
(58) Field of Search .............................. 429/27, 42, 44, 429/127, 163

(56) References Cited

U.S. PATENT DOCUMENTS

| 3,787,240 A | * | 1/1974 | Gillman et al. | |
|---|---|---|---|---|
| 4,842,963 A | | 6/1989 | Ross, Jr. | |
| 5,338,625 A | | 8/1994 | Bates et al. | |
| 5,567,210 A | | 10/1996 | Bates et al. | |
| 5,587,259 A | * | 12/1996 | Dopp et al. | 429/233 |
| D427,144 S | | 6/2000 | Buckle | |
| 2003/0152815 A1 | * | 8/2003 | LaFollette et al. | 429/7 |

OTHER PUBLICATIONS

Pique et al. ("Laser Direct Writing of Microbatteries for Integrated Power Electronics", SPIE's LASE '2001, Jan. 20–26th, 2001, San Jose, CA, Proceedings preprint (4274–39)).*

Salmon et al. ("Fabrication of rechargeable microbatteries for microelectrochemical system (MEMS) applications", Proceedings of the Intersociety Energy Conversion Engineering Conference (1998), 33rd), no month.*

* cited by examiner

Primary Examiner—Susy Tsang-Foster
(74) Attorney, Agent, or Firm—Katten Muchin Zavis Rosenman; John S. Paniaguas

(57) ABSTRACT

A microelectronic battery is formed from Zn/Air technology as a volumetric energy storage device from soft lithography techniques. The microelectric battery includes an anode and a cathode disposed in an electrolyte tank having a volume <1 $mm^3$ that is filled with an electrolyte.

17 Claims, 1 Drawing Sheet

VOLUMETRIC MICRO BATTERIES

CROSS-REFERENCE TO RELATED APPLICATIONS

The present invention is related to commonly-owned patent application Ser. No. 09/948,033, entitled "Micro Supercapacitors", filed on Sep. 5, 2001, now U.S. Pat. No. 6,621,687B2.

BACKGROUND OF THE INVENTION

1. Field of the Invention

The present invention relates to a microelectronic battery and more particularly to a microelectronic battery formed as a volume energy storage device from soft lithography techniques which provides increased capacity relative to so-called thin film batteries or area energy storage devices.

2. Description of the Prior Art

Thin film microelectronic batteries are known. Examples of such batteries are disclosed in U.S. Pat. Nos. 5,338,625 and 5,567,210. Such thin film batteries are formed by depositing an anode, such as vanadium on a substrate. A cathode, such as amorphous vanadium oxide, $VO_x$, is deposited on a portion of the anode. An amorphous oxynitride lithium electrolyte film is deposited on top of the cathode to form a Li—$VO_x$ battery cell.

The footprint of the Li—$VO_x$ battery cell is about one square centimeter and about 8 microns thick. Such a configuration provides about 130 microamp hours of battery capacity. In order to increase the capacity of such a thin film battery, the area dimensions are increased. As such, such thin film batteries are known as area energy storage devices.

Unfortunately, applications exist in which the area or footprint is limited and increased capacity is required. Examples of such applications include high speed electronics applications and certain military applications. In particular, high speed electronics applications are known in which the processing speed is so fast that on-chip/on-board power supplies are required to prevent local current starvation. Military applications are also known with space constraints and relatively high capacity requirements. Examples of such military applications include sensor applications used in covert applications. Due to the capacity or requirements and space limitations, thin film power supplies are unsuitable.

In order to increase the battery capacity for use in such applications without increasing the footprint, one possible solution is to utilize a different battery technology which provides a higher capacity. For example, Zn/Air batteries are known to have the highest volumetric energy storage (36 $J/mm^3$) of any known battery technology. In addition to having a high capacity, Zn/Air batteries provide other advantages. For example, Zn/Air batteries are also known to have a relatively flat discharge curve with a relatively long storage life. Moreover, such Zn/Air batteries have already been demonstrated to be environmentally safe and are amenable for use in medical applications. Examples of such Zn/Air batteries are disclosed in U.S. Pat. Nos. Des. 427,144 and 4,842,963.

Unfortunately, such Zn/Air batteries have heretofore only been known to be formed on a macroscale, thus making them unsuitable for use in various microelectronic applications as discussed above. Thus, there is a need for a microelectronic battery having increased capacity relative to known thin film batteries for use in applications which require relatively high capacity in a relatively small area or footprint.

SUMMARY OF THE INVENTION

Briefly, the present invention relates to a microelectronic battery which provides increased battery capacity relative to known thin film batteries without the need for increasing the footprint. In order to provide increased capacity, the microelectronic battery in accordance with the present invention is formed from Zn/Air technology as a volumetric energy storage device. As a volumetric energy storage device, the height dimension of the device may be increased relative to known thin film batteries to provide increased battery capacity without the need to increase the footprint dimensions. As such, the microelectronic battery in accordance with the present invention is suitable for various applications which require a relatively high capacity power supply with a relatively small footprint.

DESCRIPTION OF THE DRAWINGS

These and other advantages of the present invention will be readily understood with reference to the following specification and attached drawing wherein.

DETAILED DESCRIPTION

Figure 1:
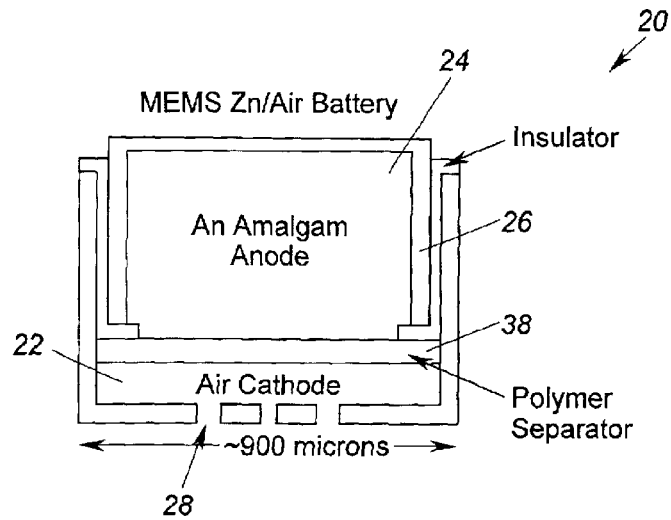
FIG. 1 is an elevational view of a microelectronic battery in accordance with the present invention.

The present invention relates to a microelectronic battery, generally identified with the reference numeral 20, formed from Zn/Air technology. The microelectronic battery 20 is formed as a volume energy storage device and provides increased battery capacity relative to known thin film batteries, for example, as discussed above, without increasing the dimensions of the footprint. For example, the microelectronic battery 20 formed, for example, as a 1 mm cube, can provide around 600 microamp hours of capacity as compared to the 130 microamp hour capacity of the Li—$VO_x$ thin film battery discussed above. In addition to increased capacity and small footprint relative to thin film batteries, the microelectronic battery 20 is amenable to being fabricated utilizing micro electromechanical systems (MEMS) fabrication processes, such as soft lithography manufacturing processes, used for non-silicon materials, such as ceramics, polymers and plastics. In addition, the microelectronic battery 20 is volume scalable which enables its volume (rather than area) to be increased or decreased depending on the application.

Turning to FIG. 1, the microelectronic battery 20 may include three parts: an air cathode 22, a Zn anode 24 and an electrolyte tank or insulator 26. As will be discussed in more detail below, the air cathode 22 is formed with a membrane with one or more access holes, generally identified with the reference numeral 28. The air access holes 28 allow air to enter the air cathode 22 where oxygen in the air is reduced and discharge is reduced.

Electrochemical reactions for Zn/Air batteries are well known and are provided below.

Anode: $Zn + 2OH^- \rightleftharpoons ZnO + H_2O + 2e$

Cathode: $O_2 + 2H_2O + 4e \rightleftharpoons 4O$

Figure 2:
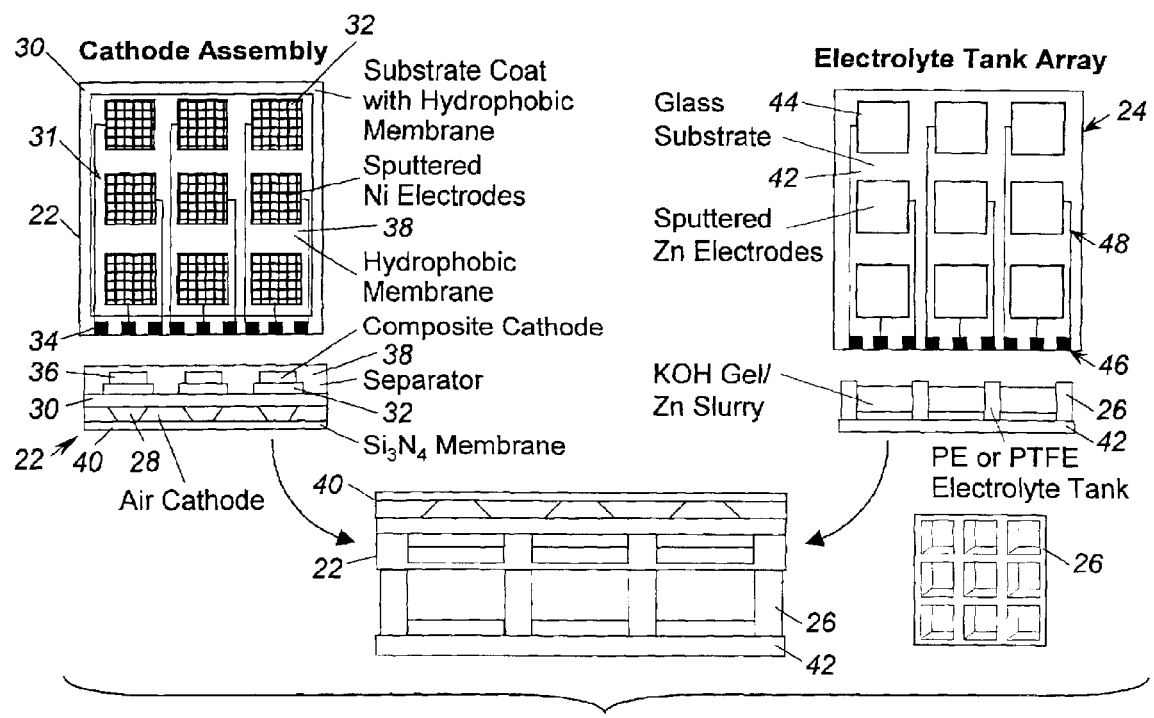
FIG. 2 is a process diagram which illustrates the fabrication of an array of microelectronic batteries as described in FIG. 1.

Overall Reaction: $2Zn + O_2 \rightleftharpoons 2ZnO \rightarrow 1.4–1.65$ volts A diagram for forming an array of microelectronic battery cells 20 is illustrated in FIG. 2. As mentioned above, each microelectronic battery cell can be formed utilizing soft lithography techniques. In particular, the air cathode 22 is formed on a substrate 30, for example, a silicon substrate. A plurality of Ni electrodes, generally identified with the reference numeral 32, are deposited on the substrate 30 utilizing known metal deposition techniques, such as RF or DC magnetron or diode sputtering techniques or other metal deposition techniques. In addition, a number of bond pads, generally identified with the reference numeral 34, are deposited by known metal deposition techniques on the substrate 30. As shown in FIG. 2, each of the bond pads 34 are disposed along an edge of the substrate 30 and connected to the electrodes by way of electrical conductors or leads, generally identified with the reference numeral 36. The bond pads 34 and the electrical conductors 36 may be formed from Ni by known metal deposition. Once the electrodes 32, bond pads 24 and electrical conductors 31 are formed on the substrate 30, a catalytic composite 36 is deposited over each electrode 32 by known techniques. The catalytic composite may be, for example, carbon black/MnO2/PTFE. Other catalytic composites may also be suitable, such as carbon fibers/M(OH)x/PTFE, where M(OH)x represents metal hydroxides including: nickel hydroxide, iron hydroxide, manganese hydroxide and chromium hydroxide.

In order to limit the influx of water and protect the substrate 30 from the electrolyte, a hydrophobic membrane 38, which acts as a separator, is deposited over the assembly. The hydrophobic membrane 38 is a gas permeable membrane formed from, a carbon black/PTFE composite or polymeric perfluoropolyalkylene oxide membrane, for example, that allows air to pass while limiting the diffusive influx of water.

As mentioned above, air access holes 28 are provided to enable air to enter into the battery cells. These air access holes 28 are formed in the substrate 30. A membrane, formed from, for example, $Si_3N_4$ is deposited on an exposed side of the substrate 30 to isolate the battery from oxygen in the atmosphere until it is desired to put the battery in use.

The Zn anode includes a glass substrate 42. A plurality of Zn electrodes 44 are deposited upon the glass substrate 42 by known techniques. As shown, a number of bond pads, generally identified with the reference numeral 46, are formed along one edge of the substrate 42. In addition, a number of electrical conductors or leads 48 are formed on the substrate 42 to connect each of the Zn electrodes 44 to each of the bond pads 46.

The electrolyte tank 26 acts as an insulator to insulate the anode 24 and cathode 22 as shown in FIG. 1. The electrolyte tank 26 may also form a tank for holding an electrolyte as shown in FIG. 2. The electrolyte tank 26 may be formed in a generally rectangular shape as shown having a number of cells commensurate with the number of Zn electrodes 44. The electrolyte tank 26 may be formed from a polymer material, such as polyethylene (PE) or polytetrafluoro ethylene (PTFE) or other solution processable polymer.

The electrolyte tank 26 is aligned over the Zn electrodes 44. The tank is then filled with an electrolyte such as KOH gel mixed with Zn powder, fibers or granules in order to maximize the surface area of the Zn available for oxidation. Additional organic components, such as binders and corrosion inhibitors, can be added to improve battery performance, if desired.

As shown in FIG. 2, the glass substrate 42 closes one end of the battery cell 20. The Zn anode 24 including the electrolyte tank 26 with electrolyte forms a base of the microelectronic battery cell 20. The air cathode 22 is disposed on top of the anode 24 such that the electrodes 32 are aligned with the cells of the electrolyte 26. Once assembled, the substrate 30 closes the other end of the microelectronic battery 20. As mentioned above, the air access holes 28 are provided in the substrate 30 and covered with a gas permeable membrane 40.

Many modifications and variations of the present invention are possible in light of the above teachings. For example, thus, it is to be understood that, within the scope of the appended claims, the invention may be practiced otherwise than as specifically described above.

What is claimed and desired to be secured by Letters Patent of the United States is.

We claim:

1. A microelectronic battery comprising:
   an air cathode;
   a zinc anode; and
   an electrolyte tank for carrying an electrolyte disposed in communication with said cathode and said anode, wherein said cathode, anode and electrolyte tank form a microelectronic volumetric storage device having a volume <1 mm$^3$, wherein said cathode is an air cathode and said anode is formed with a Zn electrode forming a microelectronic Zn/Air battery.

2. The microelectronic battery as recited in claim 1, wherein said microelectronic battery is formed as a generally cubic device defining a footprint (length (L)×width (W)) and a height (H).

3. The microelectronic battery as recited in claim 2, wherein said L, W and H dimensions are approximately equal.

4. The microelectronic battery as recited in claim 1, wherein the cathode includes a first substrate and at least one cathode carried by said substrate.

5. The microelectronic battery as recited in claim 4, further including at least one first bond pad for connection to an external electrical circuit, said at least one first bond pad electrically coupled to said at least one cathode.

6. The microelectronic battery as recited in claim 4, wherein said first substrate is formed from silicon.

7. The microelectronic battery as recited in claim 5, wherein said at least one cathode is formed from a composite device.

8. The microelectronic battery as recited in claim 7, wherein said composite includes a Ni electrode with a carbon black/MnO$_2$/PTFE composite disposed thereupon.

9. The microelectronic battery as recited in claim 4, further including a gas permeable membrane formed over said cathode.

10. The microelectronic battery as recited in claim 9, wherein said membrane is formed from a carbon black/PTFE composite.

11. The microelectronic battery as recited in claim 9, wherein said membrane is formed from a polymeric perfluoroalkylene oxide membrane.

12. The microelectronic battery as recited in claim 1, wherein said anode is formed on a second substrate.

13. The microelectronic battery as recited in claim 12, wherein said second substrate is glass.

14. The microelectronic battery as recited in claim 13, further including at least one second bond pad formed on said second substrate and electrically coupled to said zinc electrode.

15. The microelectronic battery as recited in claim 1, wherein said electrolyte tank is formed from a polymer material.

16. The microelectronic battery as recited in claim 15, wherein said polymer material is polyethylene.

17. The microelectronic battery as recited in claim 15, wherein said polymer material is polytetrafluoroethylene.

* * * * *

UNITED STATES PATENT AND TRADEMARK OFFICE
CERTIFICATE OF CORRECTION

PATENT NO.        : 6,861,170 B2
APPLICATION NO. : 09/948034
DATED             : March 1, 2005
INVENTOR(S)       : Lewis, Jr. et al.

It is certified that error appears in the above-identified patent and that said Letters Patent is hereby corrected as shown below:

Claim 2, Column 4, line 23: add --having a-- after "footprint".

Claim 2, Column 4, line 23: delete the "x" between "(L)" and "width".

Signed and Sealed this

Twenty-seventh Day of March, 2007

JON W. DUDAS
*Director of the United States Patent and Trademark Office*